US 6,699,578 B2

(12) United States Patent
Enniss et al.

(10) Patent No.: US 6,699,578 B2
(45) Date of Patent: *Mar. 2, 2004

(54) LIGHT-STABLE COLORED TRANSPARENT COMPOSITE FILMS

(75) Inventors: James P. Enniss, Martinsville, VA (US); Steven A. Barth, Martinsville, VA (US); Mary E. Lawless, Stuart, VA (US); Anthony B. Port, Leicester (GB); Elizabeth J. Packer, Coventry (GB)

(73) Assignee: CPFilms, Inc., Martinsville, VA (US)

( * ) Notice: Subject to any disclaimer, the term of this patent is extended or adjusted under 35 U.S.C. 154(b) by 67 days.

This patent is subject to a terminal disclaimer.

(21) Appl. No.: 10/124,779

(22) Filed: Apr. 18, 2002

(65) Prior Publication Data

US 2002/0114942 A1 Aug. 22, 2002

Related U.S. Application Data

(63) Continuation of application No. 09/332,527, filed on Jun. 14, 1999, now Pat. No. 6,440,551.

(51) Int. Cl.⁷ .......................... B32B 5/16; B32B 17/06; B32B 15/04
(52) U.S. Cl. ...................... 428/323; 428/329; 428/426; 428/457
(58) Field of Search .................... 428/323, 328, 428/329, 457, 426, 430, 435, 436, 441, 458, 460, 461

(56) References Cited

U.S. PATENT DOCUMENTS

| | | | |
|---|---|---|---|
| 4,158,718 A | 6/1979 | Kehl et al. | 428/461 |
| 4,250,078 A * | 2/1981 | McFarlane et al. | 260/40 R |
| 4,557,980 A | 12/1985 | Hodnett, III | 428/336 |
| 4,701,425 A | 10/1987 | Baker et al. | 501/70 |
| 4,710,433 A | 12/1987 | Rowe et al. | 428/623 |
| 4,937,116 A | 6/1990 | Kizawa et al. | 428/40 |
| 5,239,406 A | 8/1993 | Lynam | 359/275 |
| 5,362,689 A | 11/1994 | Morimoto et al. | 501/70 |
| 5,481,853 A | 1/1996 | Nasrallah et al. | 53/453 |
| 5,523,877 A | 6/1996 | Lynam | 359/275 |
| 5,674,618 A | 10/1997 | Lee et al. | 428/402 |
| 5,680,245 A | 10/1997 | Lynam | 359/265 |
| 5,926,310 A | 7/1999 | Tamura et al. | 359/350 |
| 6,145,984 A | 11/2000 | Earwig | 351/49 |
| 6,375,864 B1 * | 4/2002 | Phillips et al. | 252/301.33 |

* cited by examiner

Primary Examiner—Holly Rickman
(74) Attorney, Agent, or Firm—Nixon Vanderhye P.C.

(57) ABSTRACT

Composite film structures exhibit a predetermined finished color tone comprised of a transparent film layer which exhibits a color deficiency as compared to the finished color tone, and a pigment which is visually associated with, and satisfies the color deficiency of, the film layer. Most preferably, the pigment is provided as a homogenous dispersion in a transparent color-matching layer positioned adjacent to the film layer. Thus, when the film and color-matching layers are viewed collectively as a unit, the perceived color tone will be that of the finished predetermined color tone. That is, the color-matching layer provides visually an additive effect on the perceived color of the composite film structure.

30 Claims, 5 Drawing Sheets

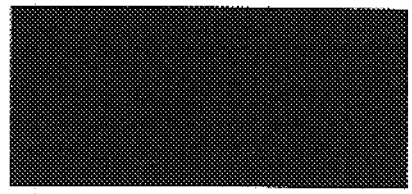
Fig.10-Invention
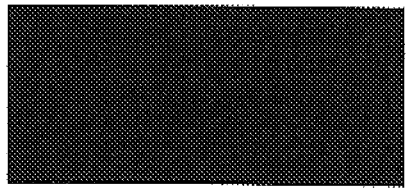
Fig.11- Comp.1
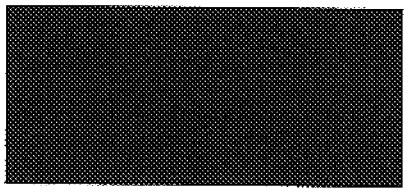
Fig.12- Comp.2
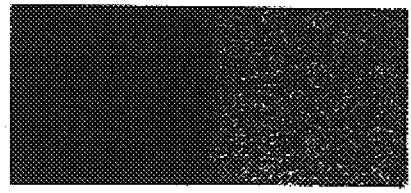
Fig.13- Comp.3

LIGHT-STABLE COLORED TRANSPARENT COMPOSITE FILMS

This application is a continuation of U.S. patent application Ser. No. 09/332,527, filed Jun. 14, 1999 (now U.S. Pat. No. 6,440,551), the entire content of which is hereby incorporated by reference in this application.

FIELD OF THE INVENTION

The present invention relates to colored transparent films. In particularly preferred forms, the present invention is embodied in colored transparent composite films which exhibit exceptional light stability (anti-fading) characteristics.

BACKGROUND AND SUMMARY OF THE INVENTION

Transparent colored films are employed in a number of end-use applications, for example, as window films, light filters and the like. When employed as window films in the building and automotive industries, the colored transparent window films are typically adhered to glass window surfaces via a suitable adhesive so as to reduce the amount of near infrared, ultra-violet and/or visible radiation entering the building or automotive interior space. Such solar films therefore assist the occupants by providing less glare, reducing interior heating effects and the like.

Colored transparent films are typically provided by dyeing a suitable thermoplastic (preferably polyester) film substrate as is disclosed more completely in U.S. Pat. Nos. 3,989,453; 3,943,105; 3,932,126; 4,050,892 and 4,047,889 (the entire content of each being incorporated expressly hereinto by reference). Thus, the thermoplastic film substrate may be preconditioned to enhance affinity to solvent or disperse dyes, followed by contacting the preconditioned film substrate with an organic dye-containing paste or solution.

Gray-toned (i.e., so-called "smoke-colored") transparent films are especially desirable in the market and are produced by suitable dyeing of the film substrates using the necessary proportions of red, blue and yellow organic dyes. One problem which these conventional gray-toned transparent films experience, however, is that the yellow dye component is more susceptible to light degradation as compared to the red and blue dye components. Thus, over prolonged exposure to light, the yellow dye component of the gray-toned dyed film tends to decompose (fade) thereby changing the visual appearance of the film undesirably to a more purple color tone due to the then more dominant presence of the red and blue dyes remaining in the dyed film.

It would therefore be especially desirable if colored (dyed) transparent thermoplastic films could be rendered more light stable thereby minimizing (or preventing entirely) fading and/or changing color tones over time. It is towards fulfilling such a need that the present invention is directed.

Broadly, the present invention is embodied in composite structures exhibiting a predetermined finished color film tone comprised of a transparent film layer which exhibits a color deficiency as compared to the finished color tone, and a pigment which is visually associated with, and satisfies the color deficiency of, the film layer. Most preferably, the pigment is provided as a homogenous dispersion in a transparent color-matching layer positioned adjacent to the film layer. Thus, when the film and color-matching layers are viewed collectively as a unit, the perceived color tone will be that of the finished predetermined color tone. In other words, the color-matching layer provides visually an additive effect on the perceived color of the composite film structure.

As a practical matter, therefore, the color deficiency of the film layer can be selected to be that particular dye which is more light unstable and thereby more likely to degrade over time when exposed to light. The pigment in the color-matching layer (which would inherently be more color stable as compared to the dye) may then be selected to satisfy the color deficiency in the film layer. As a result, a more light stable transparent color film composite structure ensues (i.e., due to the lesser amount (if any) of more light unstable dye(s) in the film and the greater amount of more light stable pigments in the adjacent color-matching layer).

These and other aspects and advantages of the present invention will become more clear after careful consideration is given to the following detailed description of the preferred exemplary embodiments.

BRIEF DESCRIPTION OF THE ACCOMPANYING DRAWINGS

The file of this patent contains at least one drawing executed in color. Copies of this patent with color drawing(s) will be provided by the Patent and Trademark Office upon request and payment of the necessary fee.

Reference will hereinafter be made to the accompanying drawings, wherein like reference numerals throughout the various FIGURES denote like elements, and wherein, FIG. 1 is a greatly enlarged schematic cross-section of one embodiment of a composite film in accordance with the present invention;

FIGS. 5–9 are graphical representations of the color stability test data obtained by the Example 2 below; and FIGS. 10–13 are color photoprints each visually depicting the non-weathered finished color tone (visible on left-hand side of each sample) and the results of accelerated weather testing (visible on the right-hand side of each sample) on such finished color tone obtained according to Example 2 below, wherein FIG. 10 is a sample in accordance with the present invention, and FIGS. 11–13 are each representative of commercially available transparent colored films.

DETAILED DESCRIPTION OF THE INVENTION

I. Definitions

The terms "hue", "chroma" (sometimes referred to in the art as intensity of color saturation) and "value" are the color coordinates associated with the Munsell color system (see U.S. Pat. No. 824,374, the entire content of which is incorporated fully hereinto by reference).

The term "colorant" is any material which exhibits hue, chroma and/or value. Thus, a colorant may be one which exhibits a perceived color (e.g. red, blue and/or yellow) in which case it has a definite hue and/or chroma and is characterized as being chromatic. A colorant may also be a material which lacks both hue and chroma, but which nonetheless contributes to the value coordinate, in which case it is characterized as achromatic.

A "pigment" is a particulate material which is a colorant.

The term "transparent" connotes the ability to perceive visually an object, indicia, words and the like through a medium, which is a film in the preferred embodiment of this invention. More specifically, the term "transparent" as used herein and in the accompanying claims means the medium (e.g., film) exhibits a haze value (ASTM D 1003-61) of not greater than about 25%, preferably not greater than about 5%, and a visible light transmission (VLT) through the film structure (ASTM E903 and NFRC 300-93, "Procedure for Determining the Solar Optical Properties for Simple Fenestration Products") of between about 1% to about 90%, preferably between about 5% to about 80%, and most preferably between about 5% to about 50%. The particular haze value and VLT of a film structure will thus depend on its intended end use application. For example, window films for use with automotive glass will typically have a relatively low have value (e.g., not greater than 5%) and a relatively high VLT (e.g., between about 5 to about 50%). Film structures intended for shade applications, however, can tolerate relatively greater haze values and relatively lower VLT as compared to automotive window films.

II. Detailed Description of the Preferred Embodiments

Figure 1:
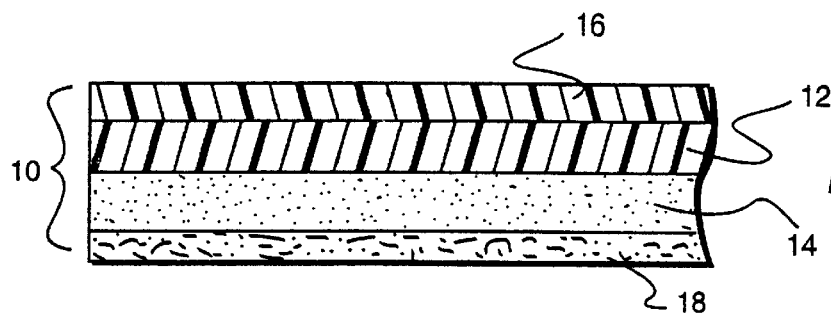

Accompanying FIG. 1 shows an enlarged schematic cross-section of one embodiment of a composite film 10 having a finished color tone in accordance with the present invention. Specifically, the composite film 10 necessarily includes a film layer 12 and a color-matching layer 14. The film layer 12 is formed of a suitable thermoplastic, preferably a polyester, such as polyethylene terephthalate (PET), or other suitable thermoplastics, such as, for example, polyacrylic, polyimides, polyamides (e.g., nylons), and polyolefins (e.g., polypropylenes, polyethylenes and the like). The thermoplastic films employed in the practice of this invention can include conventional additives either coated upon, or homogeneously blended within, the film. Thus, the thermoplastic films may include UV-absorbers, stabilizers, fillers, lubricants and other processing aids, and the like.

The thickness of film layer 12 is most advantageously between about 0.25 mil to 14 mils. For example, when composite film 10 is employed as a solar film for windows, the thickness of film layer 12 is typically in the range between about 0.5 to about 1.0 mil. When the composite film 10 is employed for other applications, such as a sun shade, the thickness of film layer 12 may be between about 1.0 mil to about 3.0 mils.

The film layer 12 may be uncolored or colored. If uncolored, then the film layer 12 will exhibit a complete deficiency in all three color coordinates of hue, chroma and value. If colored, then the film layer 12 will exhibit a deficiency in a least one color coordinate of hue, chroma and value as compared to the finished color tone of the composite film 10. In either the uncolored or colored case, therefore, the film layer 12 will exhibit a deficiency in at least one of hue, chroma and value as compared to the finished color tone of the composite film 10.

The color deficiency of the film layer 12 is satisfied in the color-matching layer 14. Specifically, the color matching layer 14 includes a homogeneous dispersion of pigment therein which satisfies the color deficiency in the film layer 12. As a result, when the film and color-matching layers 12, 14 are viewed collectively, the additive effect of their respective color tones will result in a visual perception corresponding to the finished color tone of the composite film 10. Most preferably, the color-matching layer is interior of the film layer 12 (i.e., positioned closer to the sunlight than the film layer 12).

In the composite film 10 shown in FIG. 1, the color-matching layer 14 is most preferably formed by dispersing the pigment throughout a mounting adhesive. Virtually any suitable pressure or non-pressure sensitive mounting adhesive may be employed in the practice of the present invention which allows the composite film 10 to be adhered securely to a desired support substrate. In this regard, the preferred mounting adhesive is an acrylic pressure sensitive adhesive commercially available from Solutia, Inc. under the tradename GELVA® 263 adhesive which is supplied as an acrylic resin solution.

The pigment that is employed in the practice of the present invention is broadly characterized as a particulate colorant material. That is, the pigment will impart a desired color tone to the color-matching layer and is selected based on its color characteristics of hue, chroma and/or value as well as its average particle size properties. Thus, the pigment employed in the present invention can be either chromatic in that is has at least one of hue and chroma characteristics, or can be achromatic in which case it is lacking in both hue and chroma characteristics but has a value characteristic. The pigment also cannot have too large a particle size as this would adversely scatter light making the composite film less transparent (i.e., more hazy, translucent or opaque). Therefore, the pigment employed in the practice of the present invention is required to have an average particle size of less than about 0.50 μm, more preferably less than about 0.10 μm, and most preferably less than about 0.05 μm.

Virtually any pigment that satisfies the above-noted criteria may be employed in the practice of this invention. Thus, pigments based on iron oxide, lead, chrome, ultramarine, iron blue, cadmium and the like may be employed. For example, when the color deficiency in the film layer 12 is with respect to the yellow hue and/or chroma, then a particularly preferred pigment is red iron oxide (which actually visibly has a yellowish color tone).

Figure 2:
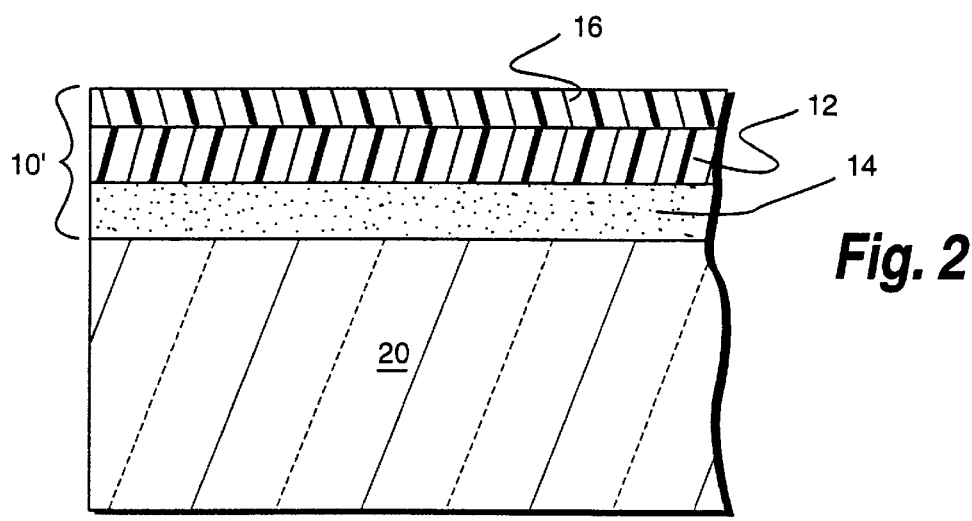
FIG. 2 is a greatly enlarged schematic cross-section of the composite film depicted in FIG. 1 applied onto a glass substrate.

When employed as a dispersion within the mounting adhesive, the pigments employed in the practice of the present invention may conveniently be mixed with the adhesive so as to be homogeneously dispersed therein and then applied onto the film layer 12 as the color-matching layer 14 in any known manner, such as dipping, spraying, padding, roller coating, gravure coating, printing or the like. Following application, the color-matching layer 14 (i.e., the adhesive material containing a homogenous dispersion of pigment therein) may be covered by a suitable release layer 18 to allow the composite film 10 to be handled and shipped prior to being mounted onto a substrate. In this regard, just prior to use, the release layer 18 will be removed or peeled away from the adhesive (color-matching) layer 14 thereby leaving the remaining laminated components of the composite film (noted by reference numeral 10' in FIG. 2). The composite film components 10' may then be affixed to a substrate, for example, a glass substrate (e.g., a building or automotive window) 20 as shown in FIG. 2.

One particularly preferred embodiment of the present invention is a gray-toned composite film having a film layer 12 which is colored with predominantly red and blue dyes and thus will exhibit a yellow color deficiency (i.e., will exhibit a purple-like color tone). Thus, the preferred gray-toned composite may be dyed with a minor, but insufficient, amount (if any) of a yellow dye. The color-matching layer 14 will thus be formed of a mounting adhesive in which a yellow-colored pigment (e.g., an iron oxide) is dispersed homogeneously. Thus, the yellow-colored pigment in the color-matching layer 14 will satisfy the yellow color deficiency of the dyed film layer 12.

The composite film 10 may also include an exterior (i.e., relative to the rigid substrate, typically glass, on which the film is adhered) polymeric protective coating 16 (typically called a "hardcoat" in art parlance). The protective coating 16 serves to impart abrasion resistance, scratch and/or chemical resistance to the composite film 10 or 10'. Typically, such coatings are curable either thermally or by radiation and can be, for example, highly cross-linked acrylic acid esters. Particularly preferred materials that may be employed in the protective coating 16 are the radiation polymerizable acrylic coatings disclosed more fully in U.S. Pat. No. 4,557,980 (the entire content of which is expressly incorporated hereinto by reference). If present, the protective coating 16 will typically have a thickness of less than 10 $\mu$, and preferably between about 1 $\mu$ to about 4.5 $\mu$.

Although the composite film 10 has been described wherein the pigment is dispersed throughout an adhesive material so as to form the color-matching layer 14, it may be desirable to disperse some (or all) of the pigment in the protective coating 16, in which case both the layers 14 and 16 (or just the layer 16) constitute the color-matching layer to satisfy the color deficiency of the film layer 12. Furthermore, it is possible that the pigment could be dispersed throughout, and thus be integrally provided with, the film layer 12. The film layer 12 with its integral dispersion of pigment could then be dyed to have a color deficiency which is integrally satisfied by the pigment contained therewithin.

Figure 3:
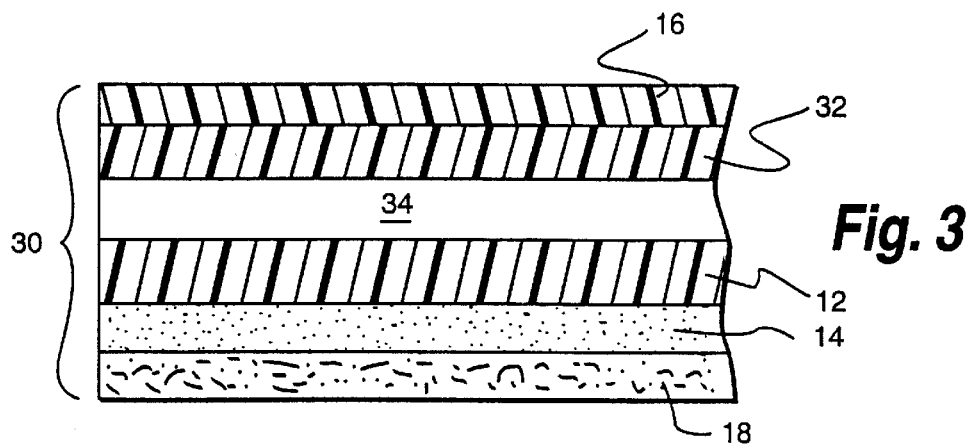
FIG. 3 is a greatly enlarged schematic cross-section of another embodiment of a composite film in accordance with the present invention.

Accompanying FIG. 3 shows another embodiment of a composite film 30 according to the present invention. In this regard, like the composite film 10 discussed above, the composite film 30 includes a thermoplastic (preferably PET) film layer 12, a color-matching adhesive layer 14 containing a pigment dispersed therein, a protective exterior coating 16, and a release layer 18 covering the adhesive color-matching layer 14. However, according to the embodiment depicted in FIG. 3, the composite film 30 is provided with another film layer 32 which is adhered to the film layer 12 by a suitable laminating adhesive layer 34.

The film layer 32, like the film layer 12 may be uncolored or colored as may be desired. Furthermore, the film layer 32 may be metallized. That is, the film layer 32 may be provided with a relatively thin metal coating, e.g., aluminum, nickel alloys (e.g., nickel-chromium alloys or their oxides), silver, titanium and the like, applied by conventional vacuum deposition techniques. If present, the metallized layer will typically have a thickness of between about 50 Å to about 600 Å.

Figure 4:
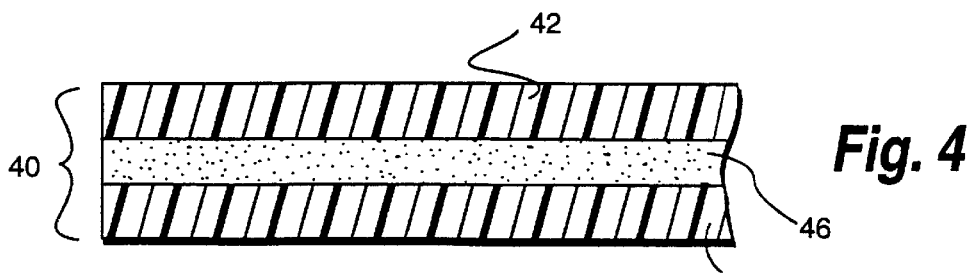
FIG. 4 is a greatly enlarged schematic cross-section of yet another embodiment of a composite film in accordance with the present invention.
Figure 5:
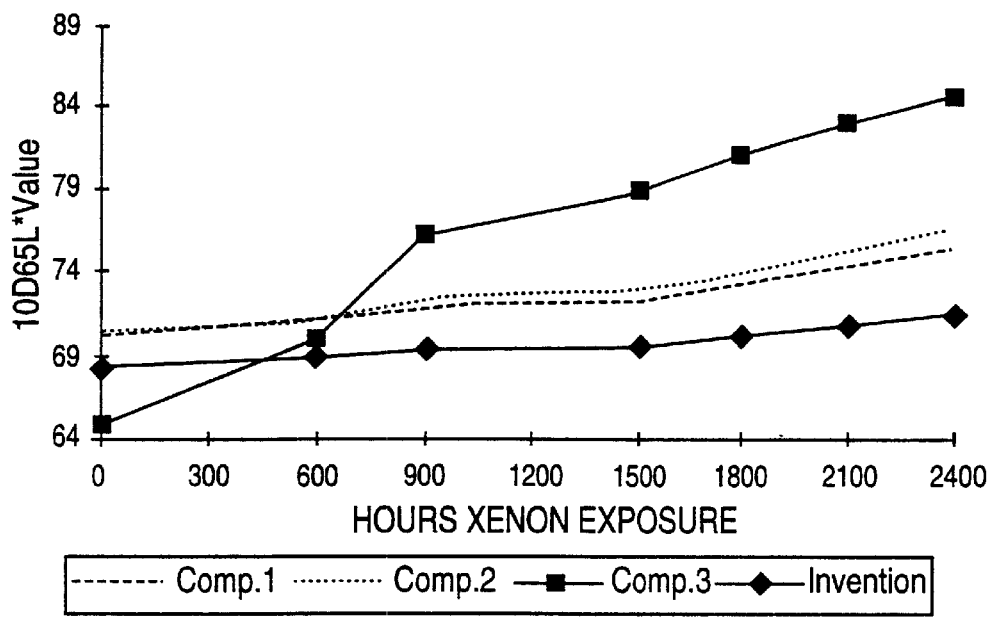
Figure 6:
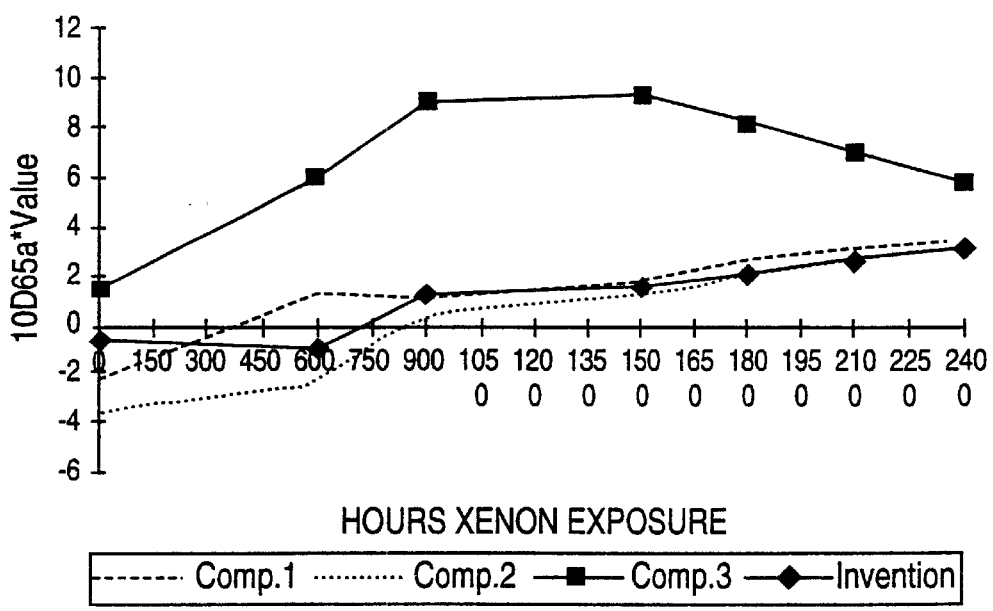
Figure 7:
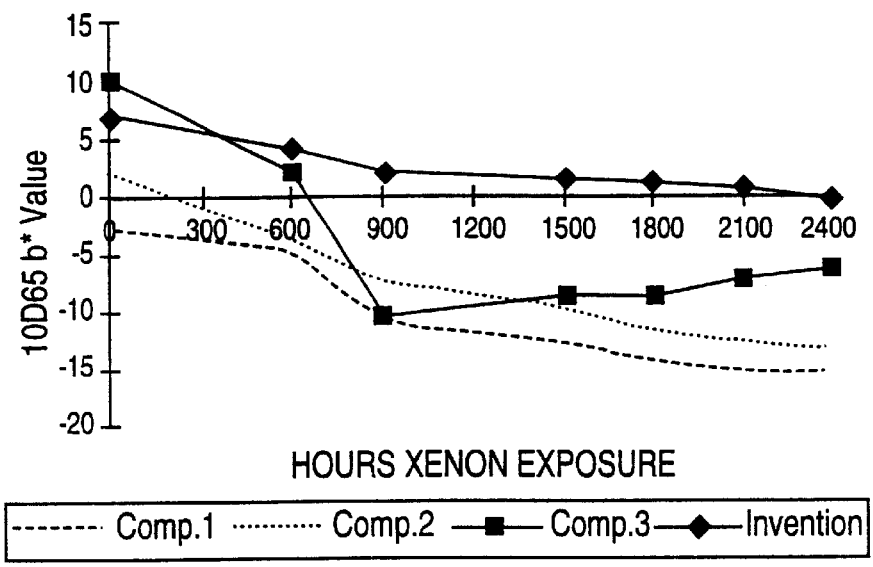
Figure 8:
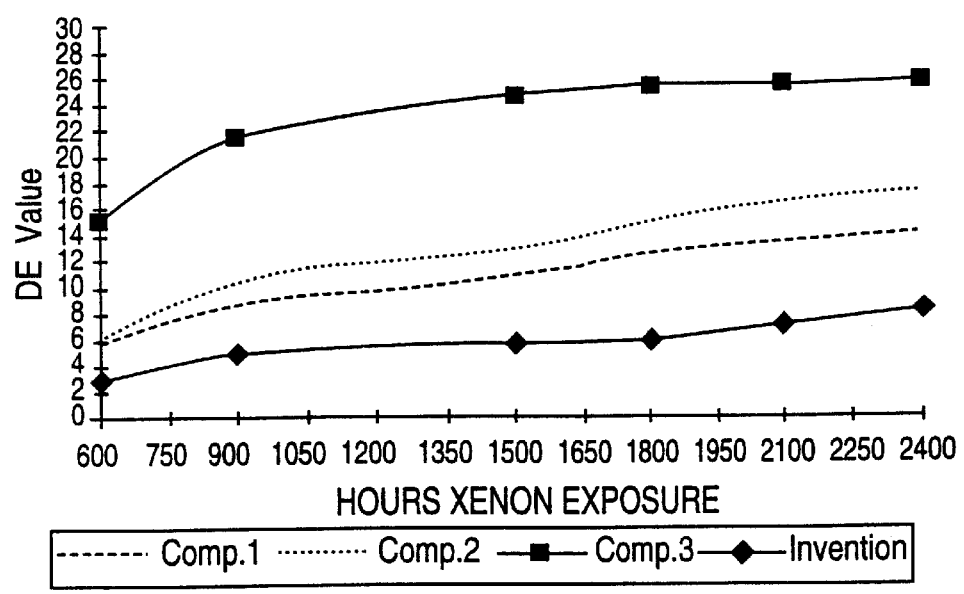
Figure 9:
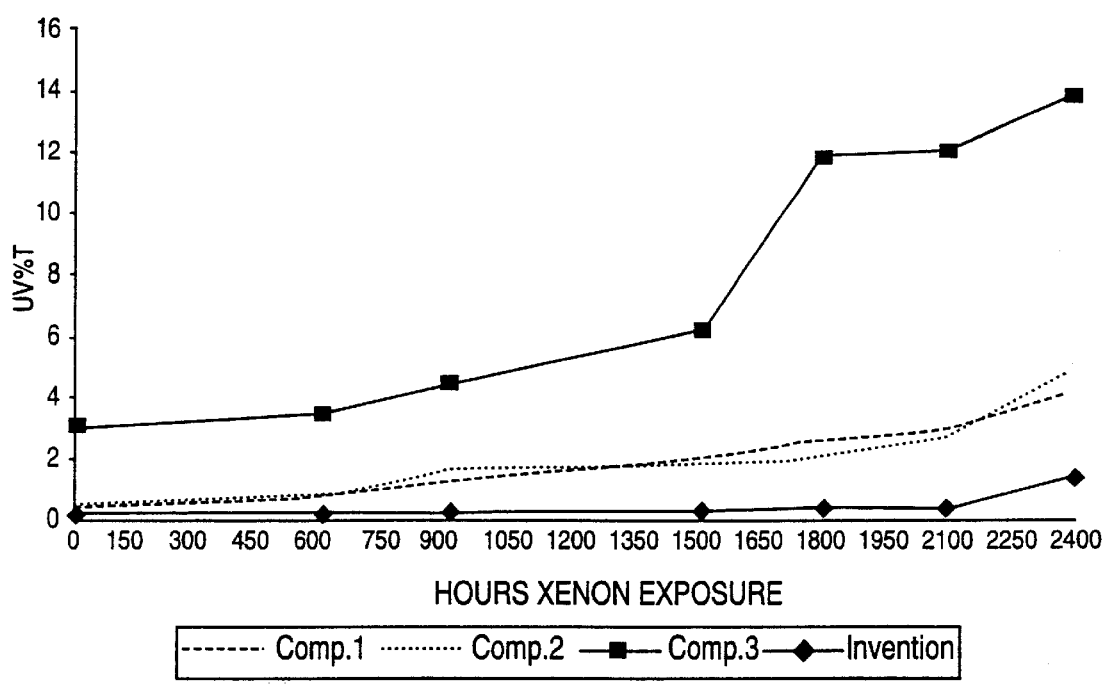

The pigment in the adhesive color-matching layer 14 may alternatively, or additionally, be provided in the laminating adhesive layer 34, if desired. Thus, the pigment may be distributed among the layers 16, 14 and 32, or be contained in any one of such layers as may be desired. For example, as shown in FIG. 4, a laminated composite film 40 is provided with thermoplastic film layers 42 and 44 laminated to one another with a suitable adhesive layer 46. One or both of the film layers 42, 44 may thus be dyed in a manner which provides for a color deficiency as compared to the finished color tone of the composite film 40. A pigment satisfying the criteria noted previously may thus be dispersed homogeneously throughout the adhesive layer 46 so as to satisfy the color deficiency of the film layers 42 and/or 44. The composite film 40 depicted in FIG. 4 is thus suitable as a window shade film.

The transparent films according to the present invention can be "engineered" to provide desired light transmission characteristics, depending on the end-use application. Most preferably, the colored transparent composite films will have a visible light transmission (VLT) of between about 1% to about 90%, preferably between about 5% to about 80%, and most preferably between about 5% to about 50%. The transparent films of this invention will also most preferably exhibit haze values of not greater than about 25%, preferably not greater than about 5%.

III. EXAMPLES

The present invention will be further understood after consideration is given to the following non-limiting Examples.

Example 1

A red iron oxide (Cl R101) pigment was blended with a scratch-resistant methyl methacrylate hardcoat material (U.S. Pat. No. 4,557,980) using methyl iso-butyl ketone (MIBK) solvent in an amount of 1 wt. % iron oxide in the hardcoat plus MIBK. The resulting mixture had CIE lab values ($10°$ standard observer and D65 light source) of L*=94.18/a*=0.84/b*=9.25 and was applied at a thickness of 1.0–1.5 microns using standard gravure coating methods onto a dyed polyester film so as to achieve a gray color tone. CIE Lab values (100 observer with D65 light source) for the resulting coated film were: L*=81.13/a*=−3.96/b*=4.9. The coated film was mounted on clear, single strength glass using an acrylic pressure sensitive adhesive (GELVA® 263 adhesive, Solutia, Inc.) which contained a benzophenone UV-absorber. The film and glass structure was then subjected to accelerated Xenon weather testing according to ASTM G26-93. The film showed enhanced color stability characteristics after 1200 hours exposure to the Xenon weather testing conditions.

Example 2

A red iron oxide (Cl R101) pigment was blended in an amount of 1 wt. % with an acrylic pressure sensitive adhesive (GELVA® 263 adhesive, Solutia, Inc.) which contained a benzophenone UV-absorber. The resulting blend of red iron oxide pigment and adhesive was used to mount the same dyed gray-tone polyester film employed in Example 1 to a clear, single strength glass for weather testing according to ASTM G26-93.

The results of the weather testing on the composite film in accordance with the present invention were compared to the weather testing results of three dyed polyester film products commercially available from CPFilms, Inc. of Martinsville, Va., identified by AT 35 Gr SR HPR (Comp. 1), AT 35 Ch SR HPR (Comp 2) and AT 35 Bz SR PS (Comp 3). The results of such comparative testing are shown graphically in the accompanying FIGS. 5–9. In addition, the results of the accelerated weather testing are shown photographically in accompanying FIGS. 10–13. In this regard, the left-hand side of each of FIGS. 10–13 represents the finished color tone of the film unexposed to the weather testing conditions, whereas the right-hand side of FIGS. 10–13 was exposed to, and thus depict the condition of the film after, weather testing. As is evident, the composite film in accordance with the invention (FIG. 10) shows enhanced color stability characteristics as compared to the conventional films Comp. 1 (FIG. 11), Comp. 2 (FIG. 12) and Comp. 3 (FIG. 13).

Example 3

Example 2 was repeated except that the 1 wt. % iron oxide containing adhesive was used to laminate a metallized film (1 mil thick aluminum metallized layer on a 15% visible light transmission gray-toned dyed polyester film) to a 0.5 mil thick clear polyester film containing UV absorbers. The resulting laminated composite film structure was mounted to a single strength glass using a non-pigmented acrylic pressure sensitive adhesive (GELVA® 263 adhesive, Solutia, Inc.) which contained a benzophenone UV-absorber. Following weather testing, the sample was visually observed for corrosion and coating instability with no significant anomalies being detected.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A composite transparent structure comprising a glass substrate, and a transparent film transparent film which exhibits a predetermined finished color tone, wherein said transparent film comprises:
    a color-deficient dyed transparent film layer which exhibits a color deficiency in at least one of hue, chroma and value as compared to the predetermined finished color tone; and
    at least one pigment having an average particle size of less than about 0.50 $\mu$m which is visually associated with the film layer and exhibits a matching color tone satisfying the color deficiency of said film layer to thereby impart to the transparent film the predetermined finished color tone when the color-deficient dyed film layer and the at least one pigment are viewed collectively as a unit.

2. The composite transparent structure of claim 1, wherein said at least one pigment is homogeneously dispersed as a blend throughout the transparent film layer.

3. The composite transparent structure of claim 2, wherein the film layer has a yellow color deficiency, and wherein the at least one pigment includes a yellow-colored pigment homogeneously dispersed as a blend through the transparent film layer.

4. The composite transparent structure of claim 3, wherein the pigment is an iron oxide.

5. The composite transparent structure of claim 1, further comprising a protective coating layer on the film layer.

6. The composite transparent structure of claim 1, wherein said film layer includes first and second film layers laminated to one another.

7. The composite transparent structure of claim 6, further comprising a protective coating layer on the film layer.

8. The composite transparent structure of claim 1 or 6, wherein said at least one pigment has an average particle size of less than about 0.10 $\mu$m.

9. The composite transparent structure of claim 1 or 6, wherein said at least one pigment has an average particle size of less than about 0.05 $\mu$m.

10. A process for making a composite transparent structure comprised of a glass substrate and a transparent film which exhibits a predetermined finished color tone, said process comprising the steps of:
    (a) providing a color-deficient dyed transparent film layer which exhibits a color deficiency in at least one of hue, chroma and value as compared to the predetermined finished color tone;
    (b) visually associating with said film layer at least one pigment having an average particle size of less than about 0.50 $\mu$m and exhibiting a matching color tone satisfying the color deficiency of said film layer to thereby impart to the transparent film the predetermined finished color tone when the color-deficient dyed film layer and the at least one pigment are viewed collectively as a unit; and
    (c) adhering the transparent film to a glass substrate to form said composite transparent structure.

11. The process of claim 10, wherein step (b) includes dispersing the pigment throughout the film layer.

12. The process of claim 10, wherein the at least one pigment has an average particle size of less than about 0.10 $\mu$m.

13. The process of claim 10, wherein the at least one pigment has an average particle size of less than about 0.05 $\mu$m.

14. A composite transparent structure comprising a glass substrate, and a transparent film which exhibits a predetermined finished color tone, wherein said transparent film comprises:
    a color-deficient dyed transparent film layer which exhibits a color deficiency in at least one of hue, chroma and value as compared to the predetermined finished color tone; and
    at least one pigment having an average particle size of less than about 0.50 $\mu$m which is visually associated with the film layer and exhibits a matching color tone satisfying the color deficiency of said film layer to thereby impart to the transparent film the predetermined finished color tone when the color-deficient dyed film layer and the at least one pigment are viewed collectively as a unit, wherein
    said film layer includes a metallized layer.

15. The composite transparent structure of claim 14, wherein said at least one pigment is homogeneously dispersed as a blend throughout the transparent film layer.

16. The composite transparent structure of claim 15, wherein the film layer has a yellow color deficiency, and wherein the at least one pigment includes a yellow-colored pigment homogeneously dispersed as a blend through the transparent film layer.

17. The composite transparent structure of claim 16, wherein the pigment is an iron oxide.

18. The composite transparent structure of claim 14, further comprising a protective coating layer on the film layer.

19. The composite transparent structure of claim 14, wherein said film layer includes first and second film layers laminated to one another.

20. The composite transparent structure of claim 19, further comprising a protective coating layer on the film layer.

21. The composite transparent structure of claim 14, 15 or 20, wherein said at least one pigment has an average particle size of less than about 0.10 $\mu$m.

22. The composite transparent structure of claim 14, 19 or 20, wherein said at least one pigment has an average particle size of less than about 0.05 $\mu$m.

23. A transparent film which exhibits a predetermined finished color tone comprising:
    a color-deficient dyed transparent film layer which exhibits a color deficiency in at least one of hue, chroma and value as compared to the predetermined finished color tone; and
    at least one pigment homogeneously dispersed as a blend throughout the transparent film layer and having an average particle size of less than about 0.50 μm, said at least one pigment being is visually associated with the film layer and exhibiting a matching color tone satisfying the color deficiency of said film layer to thereby impart to the transparent film the predetermined finished color tone when the color-deficient dyed film layer and the at least one pigment are viewed collectively as a unit, wherein said film layer includes a metallized layer.

24. The transparent film of claim 23, wherein the film layer has a yellow color deficiency, and wherein the at least one pigment includes a yellow-colored pigment homogeneously dispersed as a blend through the transparent film layer.

25. The transparent film of claim 24, wherein the pigment is an iron oxide.

26. The transparent film of claim 23, further comprising a protective coating layer on the film layer.

27. The transparent film of claim 23, wherein said film layer includes first and second film layers laminated to one another.

28. The transparent film of claim 27, further comprising a protective coating layer on the film layer.

29. The transparent film of claim 23, 27 or 28, wherein said at least one pigment has an average particle size of less than about 0.10 μm.

30. The transparent film of claim 23, 27 or 28, wherein said at least one pigment has an average particle size of less than about 0.05 μm.

* * * * *